US008358775B2

(12) United States Patent
Becker et al.

(10) Patent No.: US 8,358,775 B2
(45) Date of Patent: *Jan. 22, 2013

(54) METHOD AND TELECOMMUNICATION SYSTEM FOR TRANSMISSION OF A MESSAGE

(75) Inventors: Thomas Becker, Arnsberg (DE); Joerg Bruchertseifer, Augsburg (DE); Guido Heling, Dortmund (DE); Marco Logt, Goch (DE); Helmut Lucaβen, Stadtlohn (DE); Joern Watzke, Moosburg (DE)

(73) Assignee: Siemens Aktiengesellschaft, Munich (DE)

( * ) Notice: Subject to any disclaimer, the term of this patent is extended or adjusted under 35 U.S.C. 154(b) by 2 days.

This patent is subject to a terminal disclaimer.

(21) Appl. No.: 12/963,869

(22) Filed: Dec. 9, 2010

(65) Prior Publication Data

US 2011/0081905 A1 Apr. 7, 2011

Related U.S. Application Data

(63) Continuation of application No. 11/165,936, filed on Jun. 24, 2005, now Pat. No. 7,864,754, which is a continuation of application No. 10/182,959, filed as application No. PCT/EP01/00502 on Jan. 17, 2001, now Pat. No. 7,177,303.

(30) Foreign Application Priority Data

Feb. 2, 2000 (EP) ..................................... 00102074

(51) Int. Cl.
*H04M 1/00* (2006.01)
*H04L 12/66* (2006.01)
*H04J 3/16* (2006.01)

(52) U.S. Cl. .......................... 379/360; 370/355; 370/469

(58) Field of Classification Search ............... 379/114.2, 379/350; 370/311, 496, 522, 524, 528, 352–358, 370/389, 395.5, 386, 469, 395.21; 455/466
See application file for complete search history.

(56) References Cited

U.S. PATENT DOCUMENTS

| 5,815,506 | A | * | 9/1998 | Gokhale | 370/524 |
| 5,917,895 | A | | 6/1999 | Van Der Stoel | 379/93.09 |
| 5,966,660 | A | * | 10/1999 | Jonsson | 455/445 |
| 6,028,892 | A | | 2/2000 | Barabash et al. | 375/222 |
| 6,163,546 | A | * | 12/2000 | Sipila | 370/466 |
| 6,167,429 | A | | 12/2000 | Mercer et al. | 709/203 |
| 6,188,909 | B1 | | 2/2001 | Alanara et al. | 455/466 |

(Continued)

FOREIGN PATENT DOCUMENTS

| CA | 2217473 | 4/1999 |
| GB | 2298339 | 8/1996 |

(Continued)

OTHER PUBLICATIONS

Carr et al. "SMS Short message Peer to Peer (SMPP) Interface Specification", Aldiscon Telecommunications Software Systems. IS-SMS-SMINSP-0055. Version 3.3 (49 pages), Jan. 14, 1996.

(Continued)

*Primary Examiner* — Mohammad Islam
(74) *Attorney, Agent, or Firm* — King & Spalding L.L.P.

(57) ABSTRACT

A method and telecommunication system is disclosed for transmission of a message from a first telecommunication terminal to a second telecommunication terminal, of which at least one is connected to a line-connected telephone network. The message is converted as a short message into the short message format, a connection setup is realized and the short message is transmitted in the short message format to a short message service center and from the latter to the second telecommunication terminal, where the transmission of the short message to the short message center and/or to the second telecommunication terminal is carried out by means of DTMF or FSK off-hook signaling in the voice band.

10 Claims, 4 Drawing Sheets

U.S. PATENT DOCUMENTS

| | | | | |
|---|---|---|---|---|
| 6,292,668 | B1 | 9/2001 | Alanara et al. | 455/466 |
| 6,351,522 | B1 | 2/2002 | Vitikainen | 379/67.1 |
| 6,507,735 | B1 | 1/2003 | Baker et al. | 455/412 |
| 6,882,843 | B1 | 4/2005 | Comer | 455/445 |
| 6,961,330 | B1 | 11/2005 | Cattan et al. | 370/352 |
| 7,127,264 | B2 * | 10/2006 | Hronek et al. | 455/466 |
| 7,142,660 | B2 | 11/2006 | Freyman et al. | 379/219 |
| 7,177,303 | B2 * | 2/2007 | Becker et al. | 370/355 |
| 7,343,408 | B2 | 3/2008 | Kushwaha et al. | 709/224 |
| 7,580,719 | B2 | 8/2009 | Karmarkar | 455/466 |
| 2002/0090973 | A1 * | 7/2002 | Tendler | 455/552 |
| 2003/0078060 | A1 | 4/2003 | Becker et al. | 455/466 |
| 2004/0209614 | A1 | 10/2004 | Bright et al. | 455/426.1 |
| 2007/0112807 | A1 | 5/2007 | Heuer et al. | 707/100 |

FOREIGN PATENT DOCUMENTS

| | | |
|---|---|---|
| JP | 10336134 | 12/1998 |
| JP | 11500877 | 1/1999 |
| JP | 11500877 A | 1/1999 |
| JP | 11510035 | 8/1999 |
| JP | 11510035 A | 8/1999 |
| JP | 11298589 A | 10/1999 |
| JP | 11298957 | 10/1999 |
| WO | 9626616 | 8/1996 |
| WO | 9949644 | 9/1999 |

OTHER PUBLICATIONS

Extract from the Internet Archive of Martin Djernaes Website. Internet Archive Waybackmachine. http://djernaes.dk (10 pages), Mar. 10, 2006.

Sipila "URLs for GSM Short message Service" Nokia, Internet Draft (7 pages), May 19, 1999.

Extract from the Internet Archive of www.logica.com website "Telepath Short Message Service Center" (2 pages), Jan. 1, 1998.

"Radio Equipment and Systems (RES); Digital European Cordless Telecommunications (DECT) Common Interface Services and Facilities Requirements Specification" European Telecommunications Standards Institute ETSI. DTR/RES-3004 Report (94 pages), Jul. 1, 1992.

"Digital Enhanced Cordless Telecommunications (DECT); Data Services Profile (DSP); Multimedia Messaging Service (MMS) with Specific Provision for Facsimile Services; (Service type F, Class 2)" European Telecommunications Standards Institute ETSI. DE/DECT-020038 (162 pages), May 1, 1997.

Japanese Office Action for Application No. 2001-557310 (12 pages), Jun. 18, 2010.

International Search Report for Application No. PCT/EP01/00502 (2 pages), Jul. 30, 2001.

ETS 300 659-1, Public Switched Telephone Network (PSTN); Subscriber Line Protocol Over the Local Loop for Display (and Related) Services; Part 1: On Hook Data Transmission; 36 pages, Feb. 1997.

ETS 300 659-2, Public Switched Telephone Network (PSTN); Subscriber Line Protocol Over the Local Loop for Display (and Related) Services; Part 2: Off Hook Data Transmission; 14 pages, Sep. 1997.

ETS 300 556, European Digital Cellular Telecommunications System (Phase 2); Mobile Radio Interface Signalling Layer 3 General Aspects (GSM 04.07); 60 pages, Feb. 1995.

ETS 300 559, Digital Cellular Telecommunications System (Phase 2); Point-to-Point (PP) Short Message Service (SMS) Support on Mobile Radio Interface (GSM 03.40); 89 pages, Sep. 1996.

ETS 300 536, Digital Cellular Telecommunications System (Phase 2); Technical Realization of the Short Message Service (SMS) Point-to-Point (PP) (GSM 03.40); 106 pages, Oct. 1996.

ISO/IEC 7498-1, Information Technology—Open Systems Interconnection—Basic Reference Model: The Basic Model; 65 pages, Nov. 15, 1994.

ISO/IEC 7498-2, Information Processing Systems—Open Systems Interconnection—Basic Reference Model—Part 2: Security Architecture; 36 pages, Feb. 15, 1989.

ISO/IEC 7498-3, Information Technology—Open Systems Interconnection—Basic Reference Model: Naming and Addressing; 29 pages, Apr. 15, 1997.

ISO/IEC 7498-4, Information Processing Systems—Open Systems Interconnection—Basic Reference Model—Part 4: Management Framework; 13 pages, Nov. 15, 1989.

Eberspacher, et al., GSM Global System for Mobile Communication, Vermittlung, Dienste und Protokolle in Digitalen Mobilfunknetzen, B.G. Teubner Stuttgart; 178 pages, 1997.

* cited by examiner

FIG 5

| Information element | Reference | Presence | Format | Length |
|---|---|---|---|---|
| Protocol discriminator | TS GSM 04.07 | M | V | 1/2 octet |
| Transaction identifier | TS GSM 04.07 | M | V | 1/2 octet |
| Message type | | M | V | 1 octet |

FIG 6

| Mark Signal | Message Type | Message Lenght | CM Layer Message CP_... | Checksum |
|---|---|---|---|---|

METHOD AND TELECOMMUNICATION SYSTEM FOR TRANSMISSION OF A MESSAGE

PRIORITY CLAIM

This application is a continuation of application Ser. No. 11/165,936 filed Jun. 24, 2005 now U.S. Pat. No. 7,864,754 which is a continuation of application Ser. No. 10/182,959, filed Sep. 27, 2002 now U.S. Pat. No. 7,177,303, which is a U.S. National Stage Application of International Application No. PCT/EP01/00502 filed Jan. 17, 2001, which designates the United States of America, and claims priority to EP Application No. 00102074.2 filed Feb. 2, 2000. The contents of which are hereby incorporated by reference in their entirety.

FIELD OF TECHNOLOGY

The present disclosure relates to a method for transmission of a message from a first telecommunication terminal to a second telecommunication terminal and a telecommunication system for transmission of a message from a first telecommunication terminal to a second telecommunication terminal.

BACKGROUND

In mobile radio networks operating according to the GSM standard, communication by means of short messages on the basis of the standard provided therefore has become successfully established in addition to voice communication, while also providing cost advantages. In addition to the cost advantages, message transmission by SMS (short message service) also has advantages in specific applications, where reception and sending of an SMS can be realized without an acoustic annoyance for the environment. Furthermore, the transmission of short messages also affords additional expression and psychological articulation possibilities compared with voice communication.

SMS is a point-to-point short message service which is realized in the context of the GSM protocol architecture at the signaling level. It comprises the transport of packet-oriented useful data from and to mobile stations. The short messages are always transported via a short message service center (SM SC) in store-and-forward operation. The service center accepts the short messages, which are typically no more than 160 characters long, from a mobile station as telecommunication terminal and forwards them to a second telecommunication terminal—a further mobile station or else a fax unit or the like.

The GSM standard defines a specific protocol architecture for realizing this service. This architecture is defined in the ETSI specifications and is described in the literature (cf. for instance, J. Eberspächer, H. J. Vögel: "GSM Global System for mobile communication", Stuttgart, 1997), so that a more detailed description can be dispensed with here and reference may be made to the appended list of standards/documents.

In the existing public line-connected telephone networks, such a transmission of short messages between normal telecommunication terminals (e.g. telephones) is not possible at the present time.

GB 2 298 339 A discloses a method for transmission of short messages between a short message service center and a DECT cordless telephone, comprising a fixed station and a mobile part, in which the short message is transmitted from the service center to the fixed station via a separate connection specific to the service center operator, which connection is realized e.g. as an x.25 network, in accordance with an SMS-specific protocol.

U.S. Pat. No. 5,815,506 discloses a satellite communication system by means of which a short message generated by a fixed network subscriber is transmitted to a mobile radio subscriber in accordance with an SMS-specific protocol. For this purpose, the short message is firstly transmitted from the fixed network subscriber via a PSTN network to a short message server. From there a short message passes via a local satellite ground station, a satellite and a mobile radio station to the mobile radio subscriber. Signaling outside the voice or useful data band, so-called out-of-band signaling, is used for the short message transmission between the fixed network subscriber and the mobile radio subscriber. Message volumes of up to a maximum of 16 Kbytes can be transmitted with this type of short message transmission. A "DIAL UP" modem and also a DTMF tone identification are available in the PSTN network for this type of transmission.

Accordingly, the present disclosure is based on specifying a method and a telecommunication system which enable the transmission of short messages according to the SMS model in a line-connected telephone network (fixed network).

BRIEF SUMMARY

One exemplary concept includes in the present disclosure deals with system differences between mobile radio networks and line-connected networks (fixed networks), wherein a SMS protocol architecture of the GSM standard (or a comparable architecture of the UMTS standard) is mapped onto the fixed network and expanded.

The exemplary embodiments discussed below illustrate the transmission protocol and the physical and administrative preconditions for the transmission of short messages in the short message (SMS) format between the terminal and the short message service center. The transmission protocol is preferably defined in close accord with the protocol defined in the GSM standard. This pursues the aim of offering the transmission of short messages as a new service for the fixed network with little outlay and high compatibility with existing systems. A uniform SMS format is used in the GSM network and in the fixed network, thereby ensuring the smooth transmission of short messages between a mobile radio network that is set up and operated according to the GSM standard and the fixed network. Moreover, the path taken by one exemplary embodiment affords the considerable practical advantage that, in the specification of the SMS service, it is possible to have recourse to the greatest possible extent to the recognized, tried and tested GSM specifications that have proved reliable in the meantime.

In the physical layer, the data transmission between terminal and service center is effected by means of DTMF signaling and/or by means of an FSK (frequency shift keying) off-hook signaling in the voice band (in-band signaling) specified according to ETS 300 659-1 and ETS 300 659-2. These aforementioned transmission methods can be used in any desired combinations. In particular, the terminal can perform signaling by means of DTMF and the service center can utilize FSK modulation, in which case, of course, the respective receiving unit must be adapted for the method employed.

Above the physical layer, a data link layer is specified which ensures the logical connection setup and the fitting to the GSM-SMS standard. The latter standard is defined in particular in the ETSI documents GSM04.07 (ETS 300 556), GSM04.11 and GSM03.40. In compatibility therewith, the data link layer can be freely defined in adaptation to the concrete requirements.

In accordance with one exemplary embodiment, the newly defined physical layer and data link layer are combined with the existing layers of the GSM-SMS protocol set. This involves the short message transfer layer (SM-TL) in accordance with ETSI document GSM03.40 and the connection management layer (CM) according to GSM04.11.

It is furthermore possible for the combination of the newly defined physical layer and data link layer with the existing layers of the GSM-SMS protocol set to comprise the short message relay layer (SM-RL) according to GSM03.40 and 04.11.

The connection management layer CM specifically defines an additional message for the signaling of the connection state (CP-Connect), whose format is determined according to GSM04.07/chapter 11. There is also a specific definition with regard to the format of a message in the data link layer (DL). This will be discussed in more detail further below.

In another exemplary embodiment, one of the telecommunication terminals is connected to a mobile radio network that is operated for example according to the GSM standard or else the future UMTS standard, the connection between the two networks being established in a customary manner by a gateway mobile switching center.

Preferably, at least one of the telecommunication terminals is a cordless telephone from which or to which the short message is transmitted into or from the fixed network via a fixed station or private branch exchange operated for example according to the DECT standard. Modern cordless telephones are provided with an important hardware preconditions for implementing the proposed service; in particular, they are generally equipped with a suitable display unit and means for DTMF signaling and are designed for identifying the above-mentioned FSK off-hook signaling in the voice band.

BRIEF DESCRIPTION OF THE DRAWINGS

The various objects, advantages and novel features of the present disclosure will be more readily apprehended from the following Detailed Description when read in conjunction with the enclosed drawings, in which:

FIG. 5 shows an illustration of the setup of a message for the start of the procedure on the connection management layer; and FIG. 6 shows an illustration of the message format on the data link layer.

DETAILED DESCRIPTION

Figure 1:
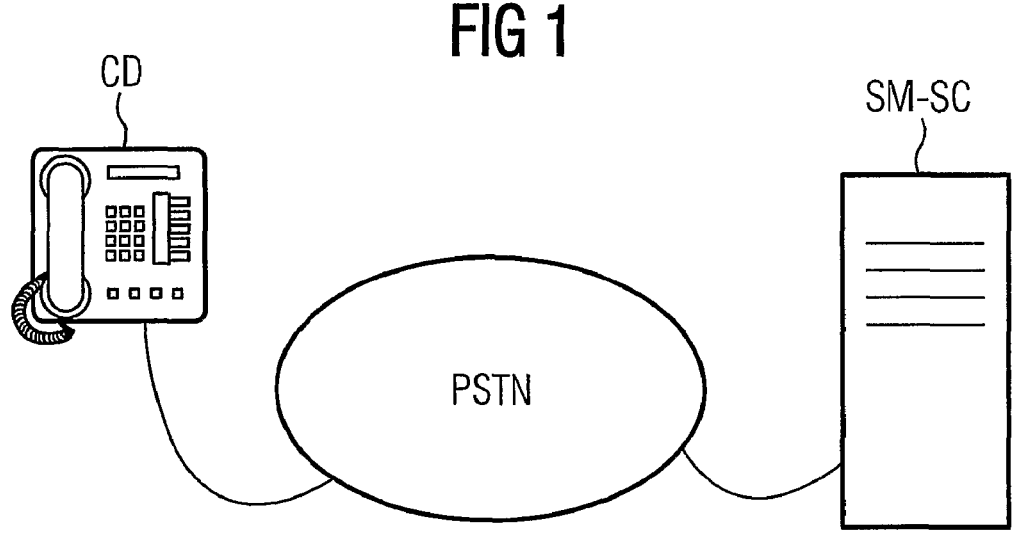
FIG. 1 shows a schematic sketch of an exemplary telecommunication system.

FIG. 1 schematically shows the basic components of a telecommunication system according to one embodiment. A public line-connected telephone network (fixed network) PSTN is disclosed having a telecommunication terminal CD connected to the network, and a short message service center SM SC likewise connected to the fixed network.

Figure 2:
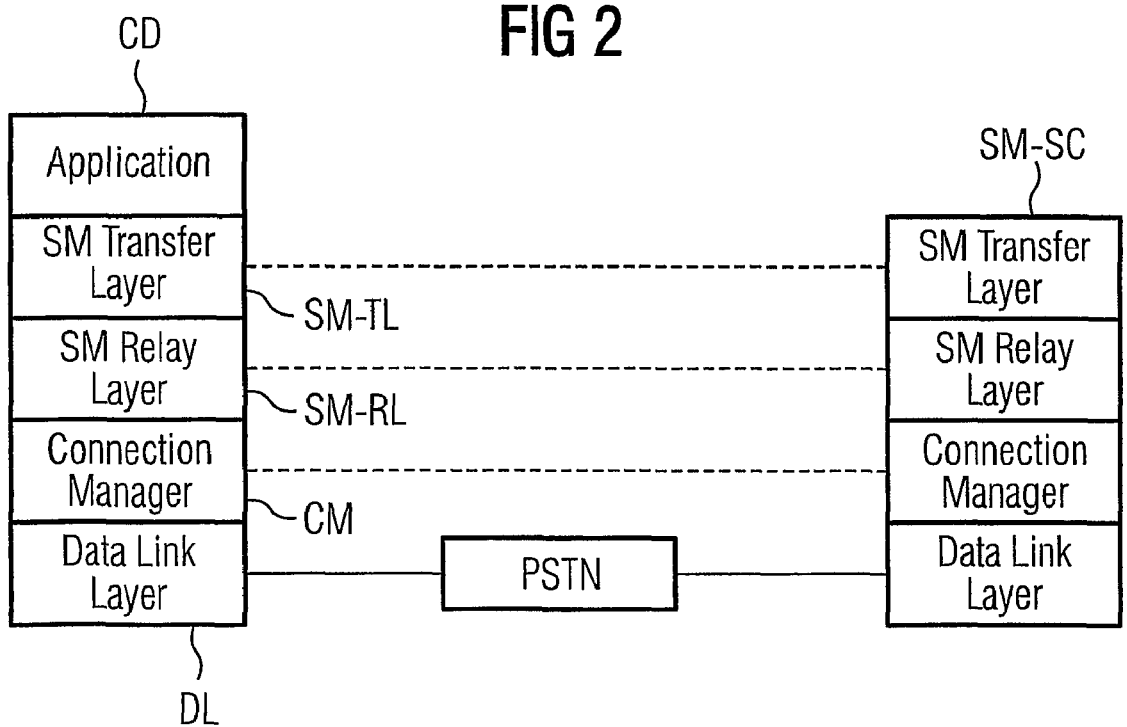
FIG. 2 shows an illustration of the layer model (SI model) of the configuration according to FIG. 1.

FIG. 2 shows the associated SI layer model, above the physical layer (not illustrated here). The layer structure comprises firstly a data link layer DL-specified in more detail further below—and furthermore the layers known per se from the GSM-SMS standard, connection manager CM, short message relay layer SM-RL and short message transfer layer SM-TL and also—on the part of the terminal—application.

The protocol descriptions of the layers SM-TL, SM-RL and CM can be gathered from the ETSI documents GSM03.40[1] and GSM04.11[3]; in this respect, see the enclosed list of standards/documents.

One precondition for the transmission of short messages via the fixed network PSTN is a circuit switching between the participating units (telecommunication terminals and short message service center). It is then unimportant whether the units are connected via ISDN or an analog interface.

Figure 3:
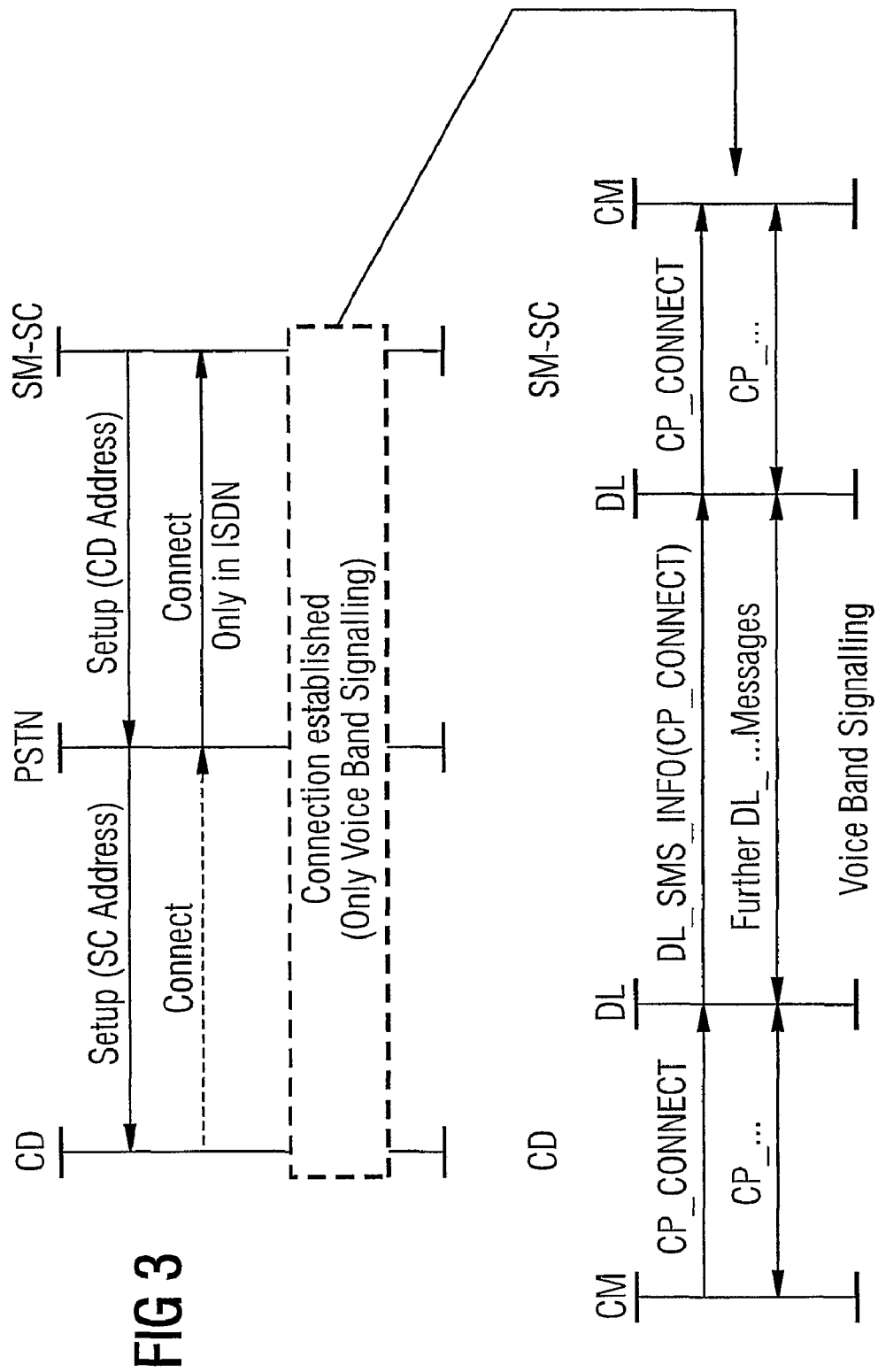
FIG. 3 shows a flow diagram for a connection setup initiated by the telecommunication terminal in accordance with one exemplary embodiment.
Figure 4:
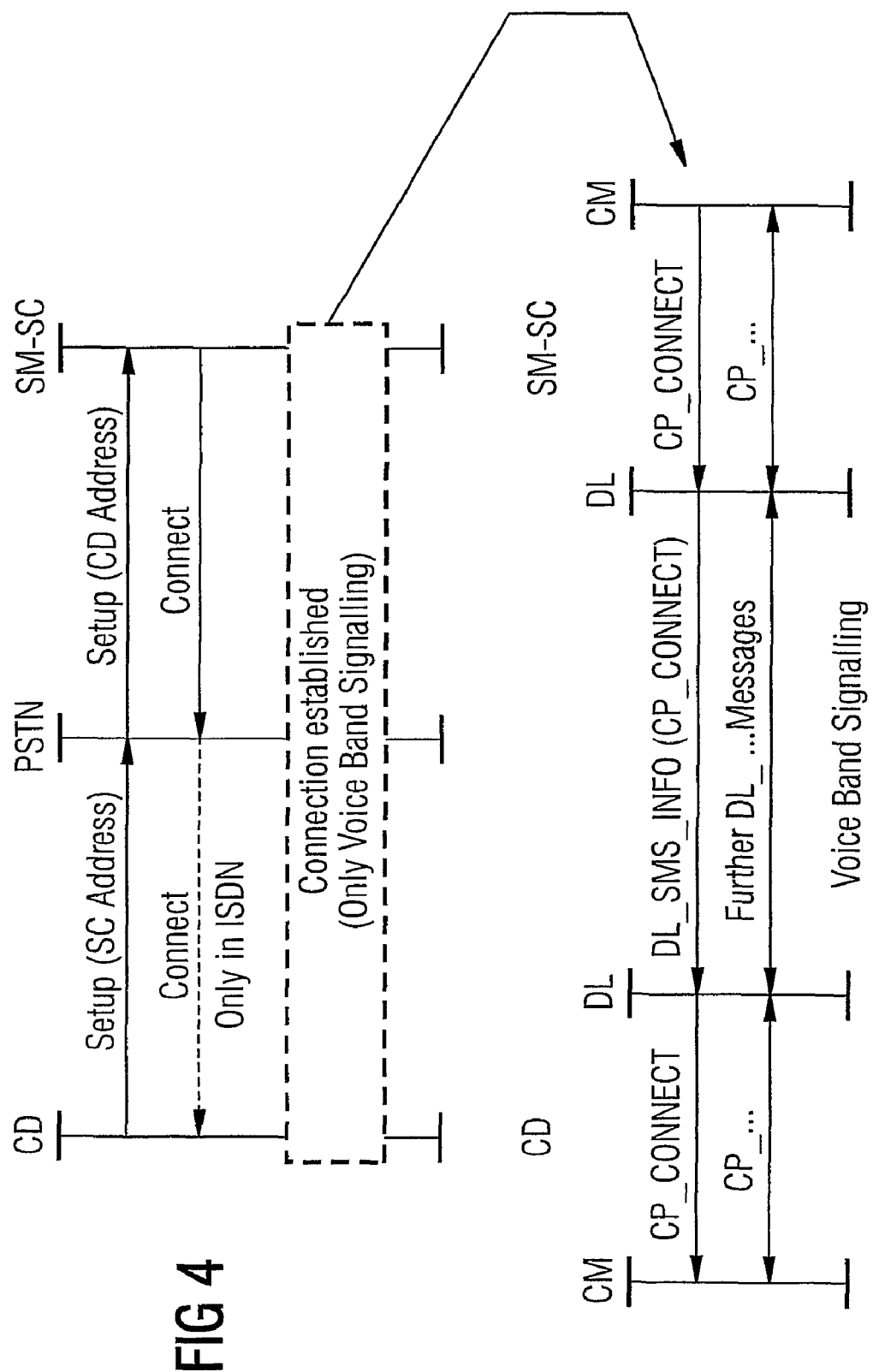
FIG. 4 shows a flow diagram for a connection setup initiated by the short message service center in accordance with another exemplary embodiment.

FIGS. 3 and 4 schematically illustrate the setup of a connection proceeding from a telecommunication terminal (FIG. 3) or proceeding from the short message service center (FIG. 4). In FIG. 3, an exemplary connection proceeding is shown among a telecommunication terminal (CD), a line-connected telephone network (PSTN) and a short message service center (SM-SC). Further connection is shown to the connection manager (CM) and the data link layer (DL) for voice band signaling.

FIG. 4 illustrates an exemplary connection proceeding from the short message service center. The same designations used in FIG. 3 are repeated in FIG. 4 and will not be discussed again.

In the case of an ISDN network, the messages are of functional type and are transmitted in the ISDN-D channel. Ringing pulses and busy signals are involved in the case of an analog network. After the setup of the connection, all the information items are transmitted between the units by FSK signaling in the voice band, specifically in accordance with the ETSI specifications ETS 300 659-1 [4] and ETS 300 659-2 [5].

FIG. 5 shows the setup of an additional message CP CONNECT, which serves for enabling the called unit to notify the calling unit of the setup of the connection. This notification is necessary in order to initiate the sequences in the CM layer. The message type coding is: 0x40 0100 0000B, and the format follows GSM04.7/chapter 11[2].

The layer DL enables the connection manager (layer CM) to send and receive messages with the partner unit, it provides the bit error detection and realizes a mark signal for a message in the layer CM.

FIG. 6 illustrates the format of a message in the data link layer. The field "mark signal" comprises a block of 80±25 bits. The field "message type" comprises one octet and contains a binary coded identification code number for the message. The coding for a DL SMS INFO message type is preferably the following: 011H 0001 0001B. The coding for a DL SMS ERROR message type is preferably the following: 012H 0001 0010 B.

The field "message length" comprises one octet and contains a binary coded number of octets of the message (with the exception of the octets of the message type, the message length and the checksum). Overall, a message length of up to 255 octets is allowed. The field "checksum" comprises one octet and contains the two compliments of the sum of all the octets in the message, starting from the "message type" octet to the end, modulo 256.

In the case of a checksum error, the data link layer of the receiving unit sends a message of the type "DL SMS ERROR" to the (originally) sending unit. In this message, the data field is empty and the message length is set to zero. The data link layer of the sending unit must thereupon repeat the last message sent.

With regard to the physical layer, it should also be noted that a half-duplex 1200 baud modulation can be used in the case of FSK signaling. In the case of DTMF signaling, each octet of a message is divided, in the data link layer, into the higher (upper) and lower nibble. Each nibble is coded with a DTMF bit. The upper nibble is sent first and then the lower nibble. In the case of DTMF signaling, the mark signal of the DL message is omitted.

It is understood that there are various other possibilities with regard to the signaling method. For example, a selection may be fixedly installed in the telecommunication terminal, to prevent alteration of the selection by the user.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A method for transmission of a message from a first telecommunication terminal to a second telecommunication terminal, of which at least one terminal is connected to a line-connected telephone network, comprising:
   inputting a short message, via an input keypad or a touchscreen, to the first telecommunication terminal;
   converting the short message into a short message format;
   establishing a connection setup to the network;
   transmitting the short message in the short message format to a short message service center and further to the second telecommunication terminal, wherein the transmission of the short message in the short message format to the short message service center and/or to the second telecommunication terminal is carried out by means of FSK off-hook signaling in the voice band, and
   converting the short message obtained from the short message service center in the second telecommunication terminal into an output format.

2. A telecommunication system for transmission of a message from a first telecommunication terminal to a second telecommunication terminal, comprising:
   a short message service center assigned to a line-connected telephone network, wherein at least one of the first telecommunication terminal and the second telecommunication terminal is connected to the line-connected telephone network;
   a first and second input keypad or a touchscreen, operatively coupled to the first and second terminals respectively for inputting the message in a short message format;
   means for converting the short message into a short message format; means for establishing a connection setup;
   means for transmitting the short message in the short message format to the short message service center and further to the second telecommunication terminal;
   wherein the transmission of the short message in the short message format to the short message service center and/ or to the second telecommunication terminal is carried out by means of FSK off-hook signaling in the voice band, and wherein
   the short message obtained from the short message service center is converted in the second telecommunication terminal into an output format.

3. The telecommunication system as claimed in claim 2, wherein one of the telecommunication terminals is connected to a mobile radio network, and the line-connected network being connected to the mobile radio network via a gateway mobile switching center.

4. The telecommunication system as claimed in claim 2, wherein one of the telecommunication terminals is a cordless telephone which is connected to the line-connected telephone network via a fixed station or private branch exchange.

5. The telecommunication system as claimed in claim 2, wherein a transmission protocol in which a short message transfer layer in accordance with ETSI GSM03.40 and a connection management layer according to GSM04.11 are defined in addition to a data link layer and a physical layer.

6. The telecommunication system as claimed in claim 5, wherein a short message relay layer according to GSM03.40 and 04.11 is defined in the transmission protocol.

7. The telecommunication system as claimed in claim 5, wherein an additional message for the specific signaling of the connection state to the calling unit in the format according to GSM04.07/chapter 11 is defined in the connection management layer.

8. The telecommunication system as claimed in claim 5, wherein the format of a message in the data link layer comprises
   a field "mark signal",
   a field "message type",
   a field "message length",
   a field "CM layer message CP_ . . . ",
   a field "checksum",
   the fields in the format being arranged in the above order.

9. The telecommunication system as claimed in claim 2, wherein the short message service center is assigned to the line-connected telephone network and serves for the transmission of short messages in the short message format.

10. A method for transmission of a message from a first to a second telecommunication terminal, wherein at least one is connected to a line-connected telephone network (PSTN), the method comprising:
   inputting the message as a short message via an input keypad or a touchscreen on the first telecommunication terminal,
   converting the short message being into the short message format,
   establishing a logical connection setup by means of an adequately specified data link layer,
   transmitting the short message being in the short message format in an adequately specified physical layer using FSK off-hook signaling in the voice band to a short message service center and from the latter to the second telecommunication terminal, and
   converting, in the second telecommunication terminal, the short message obtained from the short message service center into an output format and being output, in particular on a display unit.

* * * * *